United States Patent [19]

Armasow et al.

[11] 4,144,724
[45] Mar. 20, 1979

[54] UNIVERSAL JOINT

[75] Inventors: Waldemar Armasow; Hans Lindenthal, both of Heidenheim, Fed. Rep. of Germany

[73] Assignee: Voith Transmit GmbH, Fed. Rep. of Germany

[21] Appl. No.: 798,841

[22] Filed: May 20, 1977

[30] Foreign Application Priority Data

Jun. 10, 1976 [DE] Fed. Rep. of Germany ....... 2625960

[51] Int. Cl.$^2$ ............................. F16D 3/30; F16D 3/41
[52] U.S. Cl. .................................. 64/17 A; 64/17 R; 64/17 SP
[58] Field of Search .................. 64/17 R, 17 SP, 17 A

[56] References Cited
U.S. PATENT DOCUMENTS

| | | | |
|---|---|---|---|
| 3,074,255 | 1/1963 | Reinecke | 64/17 A |
| 3,110,166 | 11/1963 | Shutt | 64/17 R |

FOREIGN PATENT DOCUMENTS

| | | | |
|---|---|---|---|
| 550333 | 10/1956 | Belgium | 64/17 A |
| 2342426 | 9/1977 | France | 64/17 A |
| 832784 | 4/1960 | United Kingdom | 64/17 A |
| 925322 | 5/1963 | United Kingdom | 64/17 A |

Primary Examiner—Samuel Scott
Assistant Examiner—R. C. Turner
Attorney, Agent, or Firm—Ostrolenk, Faber, Gerb & Soffen

[57] ABSTRACT

A universal joint, with two preferably one-piece joint forks; a crosspiece joins the lugs of each fork; a crosspin at each side of the crosspiece faces a respective fork lug; bearings placed in the passage in each lug that receives a crosspin; the end of each crosspin is tapered narrower in stepped fashion; the roller bearings in each lug passage are correspondingly stepped; the forks are centered by thrust bearings which are preferably at the radially inner side of each fork lug.

11 Claims, 5 Drawing Figures

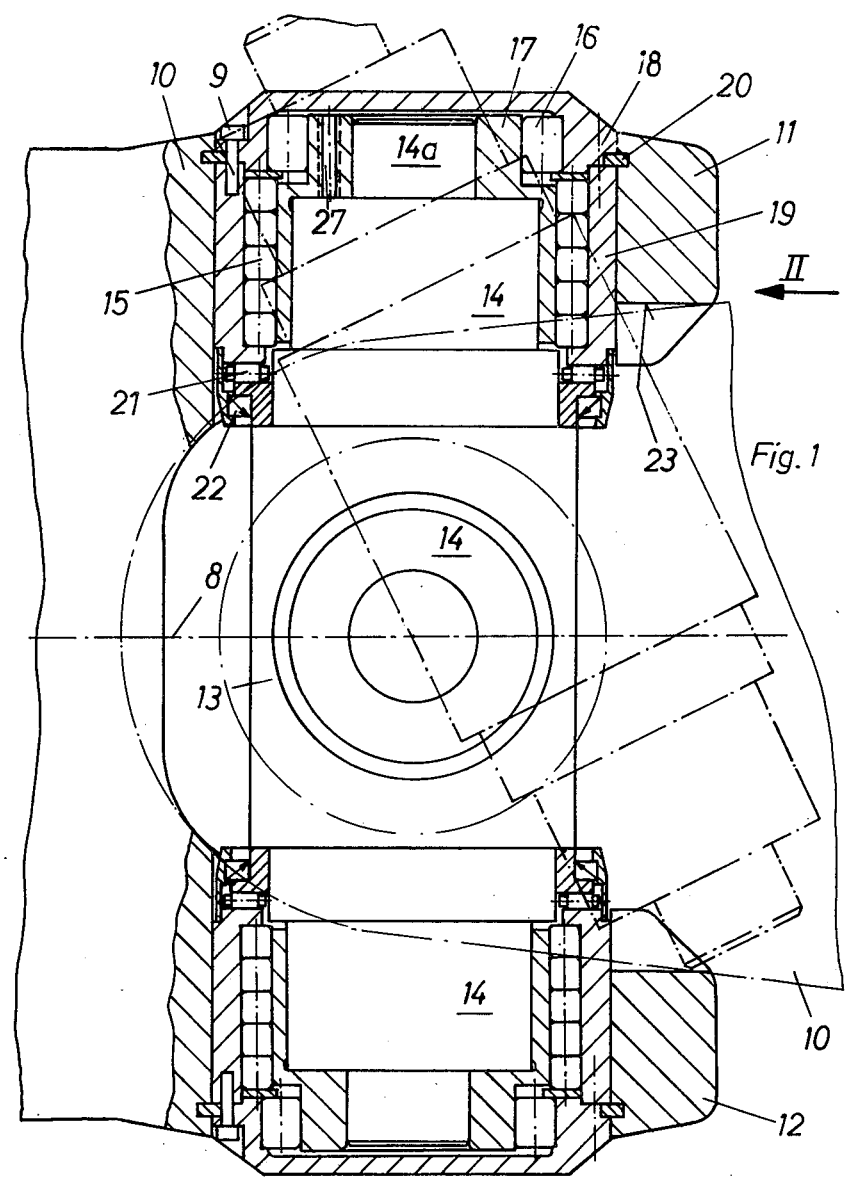
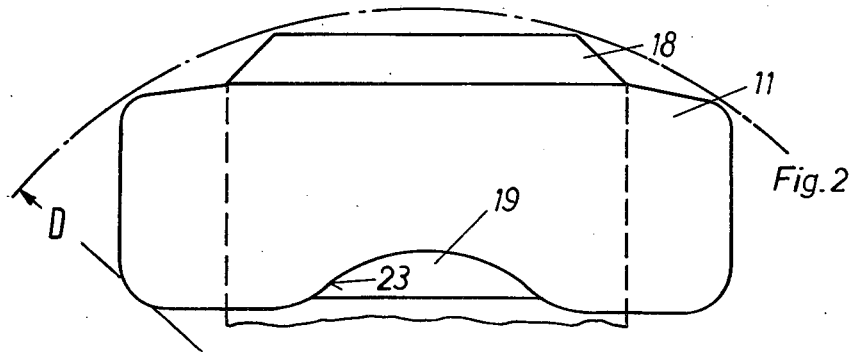

UNIVERSAL JOINT

FIELD OF THE INVENTION

The invention concerns a universal joint, particularly useful for cardan shafts, which drive heavy machines, like rolling mills.

BACKGROUND OF THE INVENTION

A universal joint comprises two bifurcated forks, each fork arranged with its fork lugs facing toward each other and each pair of fork lugs being generally in a plane that is mutually perpendicular to the plane in which the lugs of the other fork are generally located. A crosspiece extends between the opposed lugs of each fork.

In the design of these universal joints, the following partially contradictory demands should be satisfied.

A. For a given torque to be transmitted by the universal joint, the outermost diameter of rotation of the entire universal joint, measured radially from the rotation axis of the joint, should be as small as possible.

B. The roller bearings which serve as the support for the crosspiece in each lug of the forks of the joint should have a long service life.

C. To provide simplified construction and high torsion resistance, even with large bending angles, the joint forks should be made of one piece.

A universal joint described in German Offenlgungsschrift DT-OS 20 47 420 has in each lug of each fork of the joint two juxtaposed cylindrical roller bearings arranged on a common axis that is perpendicular to the axis of the joint. The crosspiece has crosspins at the radially outward ends thereof, which crosspins extent rotatably into the roller bearings in the lugs. This design and other similar designs of universal joints represents a compromise among the above mentioned demands.

One-piece joint forks, integrally including both lugs may be used. These have the advantageous characteristics of simplicity and great torsion resistance. But, to make sure that the crosspiece, which hass crosspins at the ends thereof, can be introduced into the joint forks, the crosspins must be relatively short and must be arranged relatively far inside in the radial direction (with regard to the axis of rotation of the joint forks). This has the effect that the region between the radial outer end of the roller bearings and the extreme diameter of rotation of the entire universal joint cannot be utilized for torque transmission. This means that at least one of the above described demands A or B cannot be met optimally.

However, with the use of divided or plural piece joint forks, as described in German Auslegungsschrift DAS 19 14 039, the above demand A is met. The insertion of the crosspiece into the joint forks presents no problem here, even if the crosspins of the crosspiece are long and the bearings for the crosspins are moved far to the outside, toward the extreme diameter of rotation of the universal joint. The nonunity of the joint forks causes them to lose their rigidity to a great extent, particularly if the universal joint is operated with a relatively large bending angle. As a result, the joint forks, including the bearing bushes for the crosspieces, are deformed under high load and the load capacity of the bearings and/or their service life are reduced. Thus, the gain of transmissible torque, obtained due to the arrangement of the crosspiece bearings close to the extreme diameter of rotation of the joint, is lost again to a great extent by reduced strength in the joint forks. At the same time, the usually required torsion resistance does not exist anymore.

Swiss Pat. No. 350,155 teaches a universal joint with several roller bearings in each fork lug and with crosspins which are tapered toward the outside of the joint. But, this known design concerns a completely different problem than the present invention. There the centering of the drive and driven shafts to be connected by the universal joint is being improved. To this end, at least one of the roller bearings of each fork lug is designed to be a conical needle bearing. Accordingly, the crosspins have conical tapers. The crosspins can thus be easily introduced into the one piece joint forks, despite the relatively great length of the crosspins. But, this known design is not suitable for the solution of the present invention, because a decisive increase of the transmissible torque cannot be achieved with conical needles or conical roller bearings. Rather, the problem under consideration now can only be solved by using exclusively cylindrical roller bearings.

The region between the outer end of a crosspiece roller bearing and the extreme diameter of rotation of the joint, which is not utilized in known universal joints having one piece joint forks for torque transmission, can be utilized under certain circumstances for torque transmission. The problem to be solved here was to design the crosspiece so that it could still be introduced into the joint forks, although the joint forks were of one piece and although the crosspins were of somewhat greater length. One possibility was to provide an extension on each crosspin only after the crosspiece had been introduced into the joint forks. The extension would have supported an additional roller bearing. But, a detachable connection between the crosspiece and the extensions would have had to be provided to be able to disassemble the crosspiece later. The detachable connection would have been extremely highly loaded in operation, by a bending moment which could vary under certain circumstances. The solution provided by the invention permits use of a one piece crosspiece, so that the bending moment in the crosspin is easier to control.

SUMMARY OF THE INVENTION

The present invention provides a universal joint which has two, substantially identical, one-piece joint forks. A single crosspiece with four crosspins thereon extends to the paired opposed joint fork lugs. The invention enables the extreme diameter of rotation of the joint for a given torque to be smaller than in known universal joints, i.e. the joint transmits a higher torque with a given extreme diameter of rotation.

The invention comprises use of at least one additional roller bearing, namely the roller bearing farthest out in the radial direction relative to the rotational axis of the joint. This bearing rests on a stepped or tapered preferably integral end piece of the crosspin. This end piece has a smaller diameter than the main portion of the crosspin. It was found that such a one-piece crosspiece can be easily introduced into the one piece joint forks, despite the greater length of the four crosspins on the crosspiece.

Above described Swiss Pat. No. 350,155 tapers each crosspin conically. But, in the invention, to ensure the introducibility of the one-piece crosspiece into the one-piece joint forks, it is necessary to taper the crosspins in stepped manner, as mentioned above. The use of the roller bearings for mutual centering of the two joint forks with respect to the rotational axis of the joint, in addition to their primary function of torque transmission, must be deliberately foregone. Instead, separate axial thrust bearings are provided for this purpose.

In the invention, the roller bearing farthest out in the radial direction from the rotation axis of the universal joint bears on a stepped, narrower tapered region of the crosspin of the crosspiece. Each crosspin can alternatively have, for example, two progressively narrower stepped regions each with a smaller diameter, if this is necessary to facilitate the introduction of the crosspiece into the joint fork. Each of the stepped regions can serve as a support of a roller bearing. As a rule, however, it suffices to provide only a single step on each crosspin.

The region of the crosspin which is farthest out in the radial direction is used in most cases to support a single additional roller bearing and, if necessary, to also support two axially juxtaposed roller bearings which can also have different raceway diameters.

The cylindrical roller bearings assigned to a tapered or narrowed crosspin end region can have smaller raceway diameters than the other cylindrical roller bearings. This may adapt them to the shape of the crosspin and/or provide room for fastening a bearing sleeve and, if necessary, a separate bearing cap. But if all cylindrical roller bearings are made with the same raceway diameter, there is an advantage of increased load capacity. In this last mentioned embodiment, it will always be necessary to support the cylindrical roller bearings which are arranged outside over an inner ring on the tapered region of the crosspin. Such an inner ring can also be provided with advantage for the entire torque transmitting support, namely as a replaceable wearing part so that the entire crosspiece is protected against wear.

Thrust bearings fix the crosspiece in the radial direction, relative to the rotation axes of the joint forks, so as to assure the mutual centering of the two joint forks. The thrust bearings can be arranged in conventional manner in the radial extreme region of each fork lug. But, in order to obtain more room for the torque transmitting bearings, it may be of particular advantage to arrange the thrust bearings at the radially inner regions of the fork lug. In any case, the thrust bearings are arranged between the fork lugs and the crosspiece.

A particularly expedient total combination, with thrust bearings arranged radially at the radially inner regions of the fork lugs, includes a bearing sleeve which is divided into a bearing cap, which serves at the same time as an outer race for the cylindrical roller bearing arranged farthest out in radial direction, and an outer race for the other cylindrical roller bearings. Then a prop ring is arranged between these two parts and that ring engages the fork lug. This applies a radially directed (with respect to the axis of the joint forks) force through the thrust bearing over the outer race directly to the joint fork. In alternate constructions, however, the radial force must be transmitted by means of screws connected to the joint forks. At the same time, the cylindrical roller bearing arranged farthest out in the radial direction can be moved not only particularly close to the extreme diameter of rotation of the joint forks, but the raceway diameter of this bearing can be relatively large, so that a particularly great increase of the transmissible torque is achieved.

The invention enables use of cardan shafts even where this was not possible heretofore, because of lack of space and because of the size of the torque to be transmitted. This is of particular importance, for example, when driving rolling mills. There the extreme diameter of rotation of the universal joint arranged on the roll drive journal is limited by a given roll diameter.

Accordingly, it is the primary object of the invention to provide a universal joint capable of effectively transmitting torque.

It is another object of the invention to provide such a universal joint which includes a crosspiece having crosspins that extend radially quite near to the outermost diameter of rotation of the entire universal joint.

It is yet another object of the invention to provide such a universal joint which may use one piece joint forks.

It is a further object of the invention to improve the construction of the crosspieces for the joint forks.

These and other objects of the invention will become apparent from the following description taken in conjunction with the accompanying drawings.

BRIEF DESCRIPTION OF THE DRAWINGS

Embodiments of the invention will be described below in reference to the drawings.

FIG. 1 is a longitudinal, partially cross-sectional view of a universal joint showing one joint fork and a fragment of the second joint fork;

FIG. 2 is a fragmentary view in the direction of arrow II of FIG. 1 of the upper part of FIG. 1.

Figure 3:
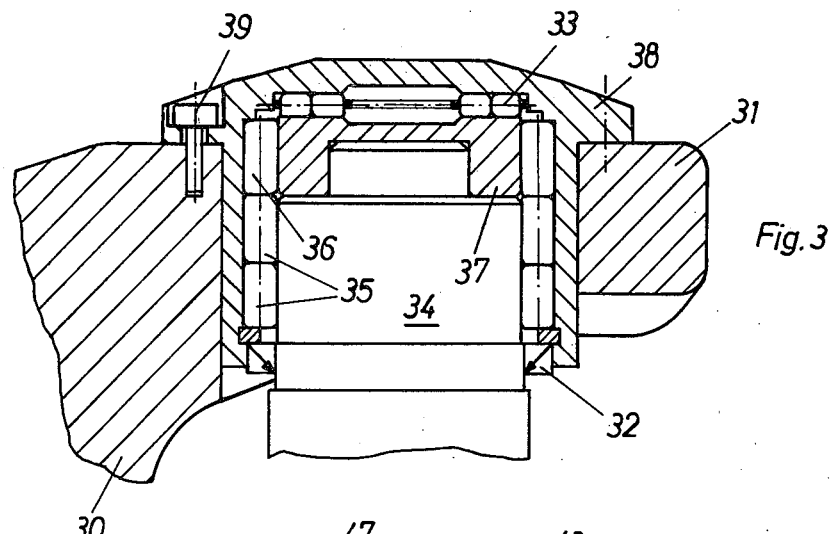
FIGS. 3 to 5 are longitudinal cross-sectional views of three modified embodiments of the crosspin support of the joint of FIG. 1.

The universal joint shown in FIGS. 1 and 2 has two identical one-piece joint forks 10. Only one of the joint forks 10 is fully visible in FIG. 1, and of this fork, only a fragment is shown. A fragment of the second fork is illustrated in broken lines. Both forks rotate about axis 8 as the joint rotates. Fork 10 includes opposed, spaced apart fork lugs 11 and 12. Each lug has a passage extending into it, for receiving the below described crosspins and the bearings that support and position them. The lugs 11, 12 are in and generally define a plane. The planes of the lugs of the two joint forks intersect, with that intersection being substantially perpendicular.

A crosspiece 13 extends across the space between lugs 11, 12. The crosspiece is provided in known manner with four crosspins 14, two each for each joint fork, i.e. one to be received in the passage of each fork lug. Each crosspin 14 is elongated by a coaxial, narrow tapered, integral end piece 14a having a smaller diameter than the crosspins of known universal joints.

Each crosspin 14 is supported from the outside in the passage in its respective fork lug 11, 12 mainly by a five-row coaxial, same diameter stack of cylindrical roller bearings 15. In addition, a one row cylindrical roller bearing 16 is placed at the radial outside of the crosspin end piece 14a. It has a smaller inside diameter than the bearings 15. Bearings 15, 16 are so-called solid roller bearings, i.e. there is no cage provided for the rollers. Both of the bearings 15, 16 have a common, but radially offset inner race 17 provided between them and the crosspin 14, 14a. The radially inner side of the bearing 16 with respect to the axis of crosspiece 13 is further radially in than the bearings 15 and the radially inner side of the race 17 for the bearings 15.

A bearing cap 18 is provided. It also serves as the outer race for the radially outer bearing 16. There is a separate outer race 19 for the five-row stack of roller bearings 15. Bearing cap 18 and outer race 19 are joined by screws 9 and together they form a bearing sleeve.

Between cap 18 and race 19, a prop ring 20 is placed, and it engages fork lug 11, so that the bearing sleeve 18, 19 is fixed in the radial direction with respect to the rotational axes 8 of the joint forks 10.

For radial fixing of crosspiece 13, which produces mutual centering of the two joint forks, there is a thrust bearing 21 placed at the radially inner end face of outer race 19. In other words, there is a thrust bearing 21 between each of said fork lugs 11 and the crosspiece 13. The entire bearing is sealed from the outside by a sealing ring 22.

Crosspiece 13 is shown in broken lines during its introduction into joint fork 10. In order to facilitate this introduction, the radially inner ends of the lugs 11 and 12 have recesses 23. Because the stepped crosspins 14 are tapered in their end regions 14a and thus only have a small diameter there, the recesses 23 can be kept quite small, so that the rigidity of the joint forks does not suffer.

FIG. 1 also shows that inner race 17 has a threaded bore 27 that extends parallel to the axis of the bearing so that the inner face 17 can be removed from the crosspin 14 by means of a forcing screw, if the universal joint must be disassembled.

The broken lines in FIG. 2 show the extreme diameter of rotation D which must not be exceeded under any circumstances in the design of the universal joint.

In FIG. 3 there is shown a universal joint embodiment, wherein elements corresponding to those shown in FIG. 1 are correspondingly numbered with reference numerals raised by 20. Only certain elements will be described, it being understood that a description of the other elements and more detail as to the described elements can be obtained from FIG. 1 and the description of the elements thereof. The universal joint of FIG. 3 comprises a joint fork 30 comprised of a fork lug 31, a one piece bearing bush 38, a crosspin 34, torque transmitting roller bearings 35, 36 around the outside of pin 34, an inner race 37 for the radially outer roller bearing 36, a radially outward thrust bearing 33 and a sealing ring 32. The thrust bearing 33 is arranged between said fork lug 31 and the crosspiece having the crosspiece 34. Due to the one piece design of bearing sleeve 38, the radially outer roller bearing 36 can be made with a larger raceway diameter, as compared to FIG. 1, with a corresponding increase of the load capacity of the bearing. But, the radial fixing of bearing sleeve 38 cannot be effected by an object like prop ring 20 of FIG. 1. Instead, the bearing sleeve 38 is secured by a screw flange joint 39 on fork lug 31.

Figure 4:
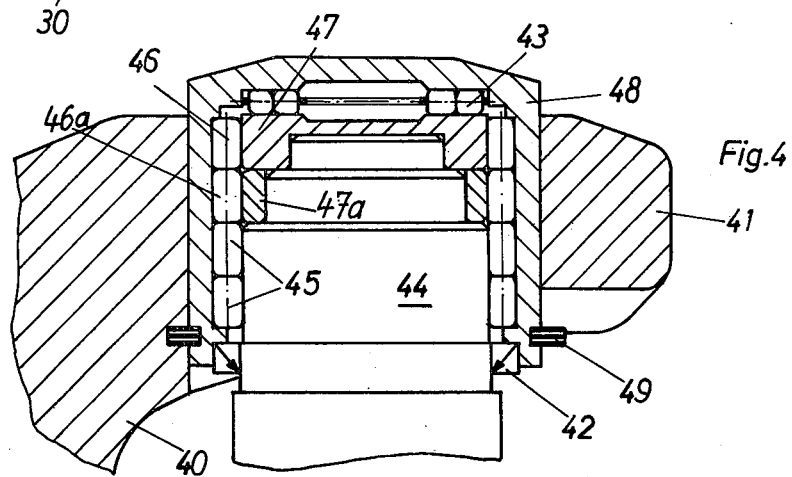

In order to avoid the disadvantages of the screw joint of FIG. 3, which include a space requirement with weakening of fork lug 31 and screws 39 stressed for tension, the joint embodiment of FIG. 4 is provided, wherein elements corresponding to those shown in FIG. 3 are correspondingly numbered with reference numerals raised by 10. This joint includes a prop ring 49 arranged in the radially inner region of fork lug 41 to fix the one-piece bearing bush 48 in the radial direction. The prop ring 49 is a so-called lamellar ring whose spiral windings are introduced successively into the respective grooves by displacement in circumferential direction. Instead of using such a lamellar ring, ring 49 may be an elastic prop ring, or a prop segment which only embraces the bearing sleeve 48 only over a part of its circumference, namely in the region of joint fork 40 open to the outside.

A bearing sleeve 48 which is fixed according to the ring of FIG. 4 in the radial direction can be readily combined with the embodiment of crosspin support 33-37, according to FIG. 3. The crosspin support of FIG. 4 differs from the embodiment of FIG. 3, in that crosspin 44 has two progressively narrowed steps in its radial outer region. This can facilitate the introduction of crosspin 44 into joint fork 40. The cylindrical roller bearings 45, 46, 46a all have the same raceway diameter here, as in FIG. 3. The two radially outer bearings 46 and 46a have respective inner races 47 and 47a. The two inner races 47, 47a may be combined as a common inner race.

Thrust bearing 43 is arranged, like bearing 33 in FIG. 3, in the radially outer region of the joint fork. It is also possible, however, to arrange a thrust bearing, as in the embodiment of FIG. 1, to be in the radially inner region of the joint fork. This way it is possible to move the roller bearings that transmit the torque further to the outside in the radial direction, so that the transmissible torque can be further increased.

Figure 5:
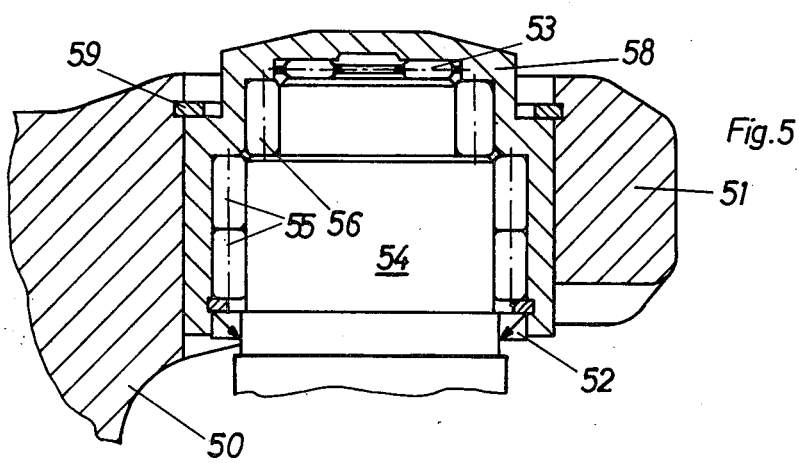

The universal joint embodiment of FIG. 5 is a particularly favorable one, as far as construction costs are concerned. In this embodiment, elements corresponding to those shown in FIG. 4 are correspondingly numbered with reference numerals raised by 10. In FIG. 5, there is a joint fork 50, a fork lug 51, a one-piece bearing sleeve or bushing 58, the crosspin 54, the cylindrical roller bearings 55 and 56 and a thrust bearing 53 which is sealed at 52. The cylindrical roller bearings 55, 56 here bear directly on the crosspin, without an inner race. Bearing sleeve 58 is stepped externally to the stepped shape of the crosspin 54 and the stepped orientations of the bearings 55, 56. As a result, room is provided in the radially outer region of the fork lug 51 for a prop ring 59 which is used for the radial fixing of bearing sleeve 58.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A universal joint, including a joint fork comprised of two spaced apart fork lugs placed radially away from the rotation axis of said universal joint; a passage in each said lug for receiving a respective crosspin;

a crosspiece extending between said lugs; said crosspiece including a respective crosspin thereon for being received in said passage of each said lug; each said crosspin including a stepped, narrow diameter section radially further out said crosspiece and a stepped wider diameter section radially nearer said joint axis;

in said lug passage are positioned, generally juxtaposed and coaxial, cylindrical roller bearings having parallel axes of rotation, where one said bearing bears on said crosspin narrower diameter section and a second said bearing bears on said crosspin wider diameter section.

2. Universal joint according to claim 1, further comprising a thrust bearing between said lugs and said crosspiece for mutual radial centering of said fork with respect to the joint rotation axis.

3. Universal joint according to claim 1, wherein said one bearing is provided with and rides over an inner raceway between said one bearing and said narrower diameter section of said crosspin.

4. Universal joint according to claim 3, wherein said second bearing has a particular diametric position with respect to the diameter of said crosspin; said inner raceway has a smaller diameter than said second bearing diametric position with respect to said crosspin.

5. Universal joint according to claim 1, wherein both said one and said second bearings have diametral positions that are the same with respect to said crosspin axis.

6. Universal joint according to claim 3, wherein said second bearing is provided with and rides over a second inner raceway between said second bearing and said wider diameter section of said crosspin.

7. Universal joint according to claim 6, wherein said inner raceway of said one bearing and said second inner raceway are a common one-piece inner raceway structure.

8. Universal joint according to claim 2, wherein each said fork lug has a radially inner and a radially outer region with respect to the axis of said fork; said thrust bearing being located at said radially inner region of each said lug.

9. Universal joint according to claim 1, further comprising a bearing sleeve in each said lug passage, which said sleeve is comprised of a radially outer bearing cap which receives said one bearing inside it and is comprised of an outer raceway extending outside of and in engagement with said second bearing;

at and between both of said bearing cap and said outer raceway is positioned a prop ring which also engages with said lug for radially positioning and holding said bearing cap and said outer raceway.

10. Universal joint according to claim 1, comprising a second joint fork which has the same said characteristics as said joint fork, said joint forks being oriented such that the planes defined by their said lugs intersect;

said crosspiece including a respective crosspin thereon positioned to extend into each said fork lug passage.

11. Universal joint according to claim 2, wherein each said thrust bearing is between a surface facing toward the joint rotation axis and an opposed surface facing away from the joint rotation axis.

* * * * *